(No Model.)
G. HANCOCK.
BRAKE FOR VELOCIPEDES.
No. 503,112. Patented Aug. 8, 1893.
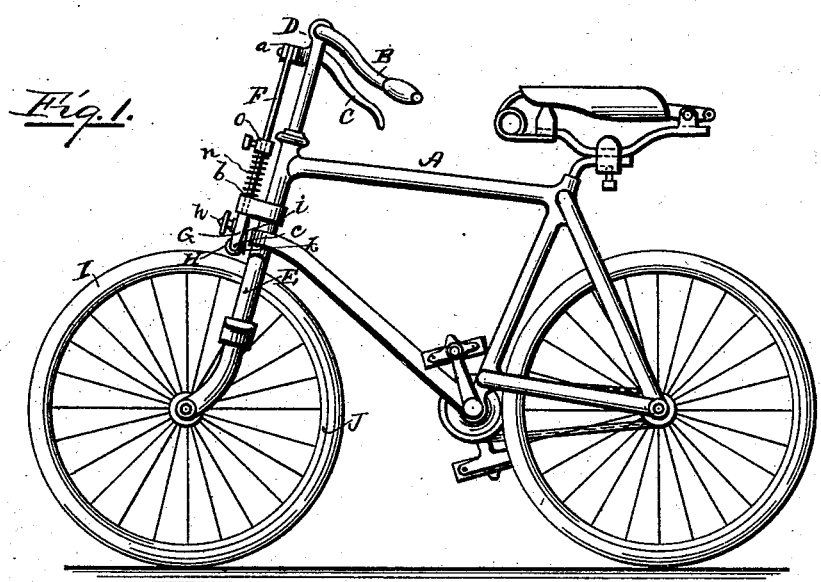
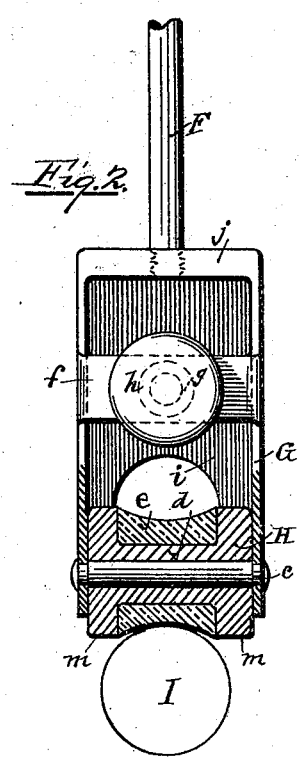
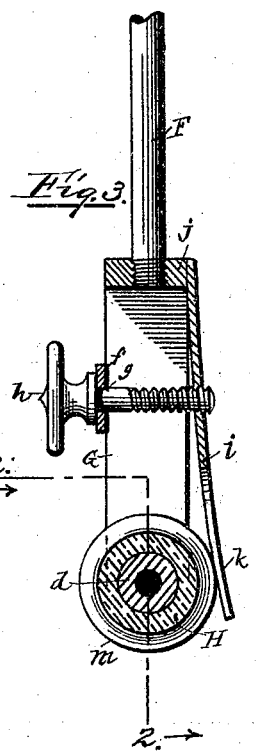
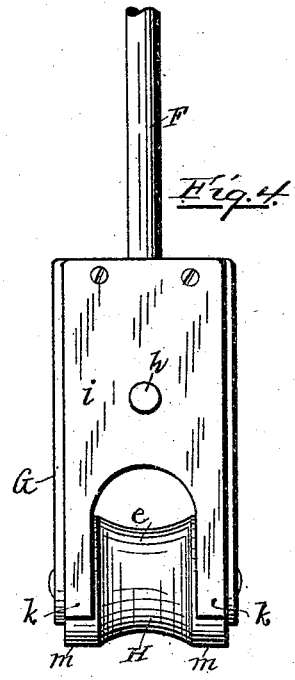
Witnesses.
Charles F. Hannigan
John S. Lynch
Inventor.
George Hancock
per S. Scholfield
attorney

UNITED STATES PATENT OFFICE.

GEORGE HANCOCK, OF PROVIDENCE, RHODE ISLAND.

BRAKE FOR VELOCIPEDES.

SPECIFICATION forming part of Letters Patent No. 503,112, dated August 8, 1893.

Application filed June 20, 1892. Serial No. 437,377. (No model.)

*To all whom it may concern:*

Be it known that I, GEORGE HANCOCK, a citizen of the United States, residing at Providence, in the State of Rhode Island, have invented a new and useful Improvement in Brakes for Velocipedes, of which the following is a specification.

The nature of my invention consists in an adjustable friction brake, comprising a frictioned roller, which serves to transfer the rubbing friction from the surface of the rubber tire to a metallic surface upon the roller, as hereinafter fully set forth.

Figure 1, represents a side elevation of a bicycle provided with my improved friction brake. Fig. 2, represents an enlarged longitudinal section of the brake roller, as taken in the line 2, 2, of Fig. 3. Fig. 3, represents a transverse central section of the same. Fig. 4, represents a rear view of the brake roller, showing a plan view of the friction spring.

In the accompanying drawings, A represents the frame of the bicycle, B the handle bar, and C the brake lever, which is jointed to the head D, of the steering fork E, and to the end $a$, of the brake lever C, is jointed the rod F, which passes loosely through the eye or bearing $b$, and to the lower end of the rod F is attached the fork G, at the lower end of which, upon the fixed pin $c$, is placed the brake roller H, which is loose upon the said pin. The roller H comprises a metal barrel $d$, upon which is vulcanized a ring of rubber $e$, which is made in grooved form to fit the periphery of the tire I, of the steering wheel J. One side of the fork G, is provided with the bar $f$, which connects the opposite arms of the fork, and forms a bearing $g$ for the adjusting screw $h$, which engages with the flat spring $i$ attached at its upper end to the head $j$ of the fork G, the arms $k, k$, of the said spring being made to bear against the periphery of the flanges $m, m$, of the metal barrel $d$, of the brake roller H, to friction the same to the required degree. The normal position of the brake roller is represented in Fig. 1, being held away from contact with the tire I, by means of the spiral spring $n$, which acts in an upward direction against the adjustable collar $o$, held upon the rod F; and when the rider desires to apply the brake, he pulls upward on the brake lever C, thus depressing the brake roller H, into contact with the periphery of the tire I, which causes the said roller to revolve against the friction of the spring $i$, so that the wear will come upon the metallic flanges of the brake roller, and not upon the rubber tire; thus greatly increasing the durability of the tire, the necessary slipping contact being transferred to a metallic wearing surface.

I claim as my invention—

The combination with the rubber tire, of the grooved brake roller, the friction spring adapted to bear against the periphery of the roller, and the adjusting screw, substantially as described.

GEORGE HANCOCK.

Witnesses:
SOCRATES SCHOLFIELD,
JOSEPH J. SCHOLFIELD.